United States Patent
Trim et al.

(10) Patent No.: US 11,587,041 B2
(45) Date of Patent: Feb. 21, 2023

(54) GUIDANCE BASED ON BIOMETRICS

(71) Applicant: INTERNATIONAL BUSINESS MACHINES CORPORATION, Armonk, NY (US)

(72) Inventors: Craig M. Trim, Ventura, CA (US); Michael Bender, Rye Brook, NY (US); Stan Kevin Daley, Atlanta, GA (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 16/552,245

(22) Filed: Aug. 27, 2019

(65) Prior Publication Data

US 2021/0065127 A1    Mar. 4, 2021

(51) Int. Cl.
   *G06Q 10/10* (2012.01)
   *G06N 5/02* (2006.01)
   *G06Q 10/1053* (2023.01)

(52) U.S. Cl.
   CPC .......... *G06Q 10/1053* (2013.01); *G06N 5/02* (2013.01)

(58) Field of Classification Search
   CPC .............................. G06Q 10/1053; G06N 5/02
   See application file for complete search history.

(56) References Cited

U.S. PATENT DOCUMENTS

| | | | |
|---|---|---|---|
| 2007/0118546 A1* | 5/2007 | Acharya | G06F 16/9535 |
| 2009/0276231 A1 | 11/2009 | Bazigos et al. | |
| 2011/0015497 A1* | 1/2011 | Eggenberger | A61B 5/167 |
| | | | 600/301 |
| 2013/0164720 A1 | 6/2013 | Siimes et al. | |
| 2016/0012559 A1 | 1/2016 | Patterson et al. | |
| 2017/0109850 A1 | 4/2017 | Chetlur et al. | |
| 2017/0173394 A1* | 6/2017 | Rider | A63B 24/0075 |
| 2017/0263147 A1* | 9/2017 | King | G11B 27/026 |
| 2018/0036591 A1 | 2/2018 | King et al. | |

(Continued)

OTHER PUBLICATIONS

"Collaborative filtering" Wikipedia, as archived Jul. 28, 2019; available at: https://web.archive.org/web/20190728154611/https://en.wikipedia.org/wiki/Collaborative_filtering (Year: 2019).*

(Continued)

*Primary Examiner* — Lynda Jasmin
*Assistant Examiner* — Brendan S O'Shea
(74) *Attorney, Agent, or Firm* — Rakesh Roy; Andrew D. Wright; Calderon, Safran & Cole, P.C.

(57) ABSTRACT

A computer-implemented method includes: receiving, by a computer device, preference information from a plurality of people, the preference information including an individual level of preference for various activities for each of the people; receiving, by the computer device, biometric data of the people, the biometric data relating to the various activities; building, by the computer device, a corpus of relationships between the preference information and the biometric data; receiving, by the computer device, biometric data of a user; and predicting, by the computer device, a user level of preference with a particular activity of the various activities, the predicting being based on a comparison of the biometric data of the user and the biometric data of the people who participated in the particular activity.

20 Claims, 6 Drawing Sheets

(56) References Cited

U.S. PATENT DOCUMENTS

| | | |
|---|---|---|
| 2018/0158025 A1 | 6/2018 | Nitta et al. |
| 2018/0211343 A1 | 7/2018 | Angus et al. |
| 2019/0050750 A1* | 2/2019 | Le .................... G06N 3/0427 |
| 2019/0160333 A1 | 5/2019 | Dawson et al. |

OTHER PUBLICATIONS

Khandelwal, Richa "Serving Athletes* with Personalized Workout Recommendations" Medium, May 10, 2018; available at: https://medium.com/nikeengineering/serving-athletes-with-personalized-workout-recommendations-285491eabc3d (Year: 2018).*

Anonymous, "Cognitive gap analysis of skills to find jobs and career paths," IP.com Disclosure No. IPCOM000246691D, Jun. 28, 2016, 6 pages.

Narravula et al., "Method and System for Providing a Path to a User to Achieve a Goal," IP.com Disclosure No. IPCOM000226006D, Mar. 20, 2013, 5 pages.

Anonymous, "System and Method for Automated Career Redirection," IP.com Disclosure No. IPCOM000249292D, Feb. 15, 2017, 4 pages.

Rangnekar et al., "Career Prediction Model Using Data Mining and Linear Classification," 2018 Fourth International Conference on Computing Communication Control and Automation (ICCUBEA), Pune, India, 2018, 6 pages.

Mell et al., "The NIST Definition of Cloud Computing", NIST, Special Publication 800-145, Sep. 2011, 7 pages.

* cited by examiner

GUIDANCE BASED ON BIOMETRICS

BACKGROUND

The present invention relates generally to providing guidance to a user based on biometrics of the user and, more particularly, to providing guidance regarding occupational options based on the user's biometrics.

A person who is considering participating in a particular activity often researches aspects of the activity before deciding whether or not to patriciate in the activity. For example, a person considering a career change might use a virtual assistant such as, for example, IBM Watson® Career Coach. (IBM and IBM Watson are registered trademarks of International Business Machines Corporation in the United States and/or other countries.) IBM Watson Career Coach is a virtual assistant that aligns company business goals with employees' career goals. Through data, interactions and updates, IBM Watson Career Coach learns about an employee's preferences and interests, and makes recommendations for existing job opportunities and how to navigate future career moves.

SUMMARY

In a first aspect of the invention, there is a computer-implemented method including: receiving, by a computer device, preference information from a plurality of people, the preference information including an individual level of preference for various activities for each of the people; receiving, by the computer device, biometric data of the people, the biometric data relating to the various activities; building, by the computer device, a corpus of relationships between the preference information and the biometric data; receiving, by the computer device, biometric data of a user; and predicting, by the computer device, a user level of preference with a particular activity of the various activities, the predicting being based on a comparison of the biometric data of the user and the biometric data of the people who participated in the particular activity.

In another aspect of the invention, there is a computer program product including a computer readable storage medium having program instructions embodied therewith. The program instructions are executable by a computing device to cause the computing device to: receive preference information from a plurality of people, the preference information including an individual level of preference for various activities for each of the people; receive biometric data of the people, the biometric data relating to the various activities; build a corpus of relationships between the preference information and the biometric data; receive biometric data of a user; and predict a user level of preference with a particular activity of the various activities, the predicting being based on a comparison of the biometric data of the user and the biometric data of the people who participated in the particular activity.

In another aspect of the invention, there is system including a processor, a computer readable memory, and a computer readable storage medium. The system includes: program instructions to receive preference information from a plurality of people, the preference information including an individual level of preference for various activities for each of the people; program instructions to receive biometric data of the people, the biometric data relating to the various activities; program instructions to build a corpus of relationships between the preference information and the biometric data; program instructions to receive biometric data of a user; and program instructions to predict a user level of preference with a particular activity of the various activities, the predicting being based on a comparison of the biometric data of the user and the biometric data of the people who participated in the particular activity. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to providing guidance to a user based on biometrics of the user and, more particularly, to providing guidance regarding occupational options based on the user's biometrics. According to aspects of the invention, a computer device compares biometric data of a user to a corpus of relationships between preference information and corresponding biometric data for various employment positions. The comparison is used to predict a level of preference of the user for a particular one of the various employment positions. In embodiments, the particular employment position is recommended to the user when the predicted level of preference is above a threshold. In this manner, implementations of the invention provide valuable information to a user for consideration when investigating new careers.

To the extent implementations of the invention collect, store, or employ personal information provided by, or obtained from, individuals (for example, biometric data, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Implementations of the invention include a method for recommending activities based on biometric readings, the method comprising: building an anonymized, crowd-sourced corpus that correlates individuals' preference levels of various activities to their respective biometric readings; and receiving biometric readings for a user, and using the corpus to determine a predicted a level of preference for one or more particular activities for the user, based on the user's biometric readings. Some embodiments include recommending one or more physical actions/training (e.g., an exercise regimen) for the user to perform to affect the user's biometric readings in a way that would increase the user's predicted level of preference for a particular activity. In some embodiments, the particular activities are associated with particular professions/careers/jobs, and the method further comprises determining whether the user would be likely to prefer a particular profession/career/job based on the determination of the predicted level of preference for the one or more particular activities.

Implementations of the invention include features that are not well-understood, routine, or conventional activity in the relevant art. For example, comparing biometric data of a user with biometric data of people that are known to prefer a particular activity in order to predict a satisfaction level of the user with that particular activity is not well-understood, routine, or conventional. In addition, implementations of the invention add unconventional steps to confine the claimed invention to the application of predicting a user level of preference for a particular activity. Further, implementations of the invention are a practical application in that biometric data from biometric sensors is used to predict preference levels in order to better recommend personalized career options to users.

A problem currently exists in that a person considering a career change may not know the physical aspects of various jobs and/or whether they possess the physical attributes and abilities that would make the job preferable to them. Embodiments of the invention predict a user's preference level with a particular job (or other activity) based on their biometrics and how their biometrics compare to those of other people that prefer that particular job (or other activity). Embodiments of the invention provide suggestions to a user regarding how to alter their biometrics to increase their preference for a particular job (or other activity). In this disclosure, the terms "job", "career", and "activity" are used interchangeably to indicate an activity that is the subject of a recommendation or other analysis by embodiments of the invention. Use of any one of these terms is not to be construed as excluding any of the others of these terms or any other activity that is the subject of a recommendation or other analysis by embodiments of the invention.

Embodiments of the invention include systems and methods of evaluating individuals (users) with interest in a particular job or career based on comparing their biometrics captured by Internet of Things (IoT) devices (or other devices) to the biometrics of other individuals that are in that job or career and how happy and/or successful those individuals are. In embodiments, when an applicant (user) is looking at a career opportunity which may be difficult for them to prefer based on their biometric readings, the system points to places where the applicant may be able to alter their biometrics in order to improve their likelihood of preferring the position. Strength, range of motion, dexterity, endurance, and balance are non-limiting examples of biometrics (or biometric data) that can help predict an individual's ability to prefer the responsibilities of a job. In embodiments, having one or more of these biometrics in a preferred range (or above a certain threshold) will help avoid injury. In addition, these (and other) biometrics can be altered if the user so desires. The term "biometrics" is used herein to mean body measurements and calculations. The term "biometric data" is used to represent data including and related to the biometrics.

Embodiments of the invention are applicable to individuals looking for a job that is a new position, as well as individuals already working in a particular position but looking for new responsibilities. Embodiments are for use by a prospective employee looking to see how they rank against others who are happy in a particular position. In embodiments, crowd sourced data is utilized. In embodiments, the crowd sourced data will be sanitized and anonymized to prevent unauthorized disclosure or use of potentially private data. In addition, in embodiments, the system shows the probability that an individual will prefer the work (which could be associated with quality of the work product), but does not make a determination as to whether an individual can or cannot fulfill the requirements of a position.

Embodiments include systems and methods to provide career guidance based on biometric readings and reactions to environmental conditions based on comparing an individual's biometrics to a crowd-sourced pool of similar applicants. In embodiments, an individual registers their IoT sensors to capture biometric data; other people enter or provide feedback (crowd sourced) on their preference in a job or in a job family; the system compares the individual to the crowd to determine a probability of preferring the job or job family based on biometrics and reactions: the system determines changes helpful to improving the probability of happiness; the system recommends actions helpful to altering the individual's biometrics; and the system calculates probabilities for success (such as happiness in the job).

An example of an application of an embodiment of the invention is as follows. A user is considering getting a job in the construction industry. The system determines that the user's balance is in the range of individuals that do not find their job in this field preferable. The system recommends training to alter the user's biometrics to a range comparable to others in the job family that are preferring their work. The system determines the user's sensitivity to balance metrics after the user takes a balance test on an electronic balance board. The system compares others with similar metrics who went through a balance development process and identifies those that showed significant positive development based on using the balance board for two months.

In another example, a user desires a promotion from a pool lifeguard to a beach lifeguard. Based on the ocean currents, the system recommends that the user follow an aerobic routine to alter the user's ability to patrol the beach so that it is in line with beach lifeguards that prefer their work. The system determines this by comparing the user's heart rate and respiratory rate to those that found the lifeguard job not fulfilling.

In another example, a user is considering a job as a plumber. The system determines that the user's flexibility aligns with a subset of plumbers that have indicated they do not like working in tight spaces. The system provides to the user a list of flexibility training and also provides the probability of meeting the desired level of flexibility within six months as very high. The system determines the probability by using measurements of the user's flexibility (e.g. the amount that the user can twist the user's torso in degrees) compared to plumbers that preferred the job.

In another example, a user is very sensitive to cold. The system determines that others with similar sensitivity do not prefer working in a refrigerated environment (e.g., a food storage environment). The system determines the user's sensitivity by analyzing, for example, comments the user made in colder temperatures, sensors that indicated that the user was shivering below 25 degrees F., and image analysis from cameras that showed the user's hands turning bright red below 25 degrees F.

Embodiments of the invention provide guidance to an individual about their ability to prefer a job based on comparing biometrics of the individual to a crowd-sourced corpus of other individuals that have worked in a similar capacity. Embodiments provide guidance on activities and training to increase the probability of preferring a particular job. Embodiments of the invention directly enhance virtual assistants, such as for example, the IBM Watson® Career Coach, that provide assistance to users in finding new careers.

Embodiments of the invention use the same IoT devices used to initially measure the user to measure the user once they are on the job and ensure that they are optimizing their job preference based on their biometrics. For example, in a delivery job that involves heavy lifting, various sensors (for example, in shoes, in a back brace and/or along a uniform) help ensure that the user is lifting heavy boxes using their knees rather than their back. This biometric data helps an individual employee prefer their job more by identifying biometric changes that can be implemented (e.g. leg strengthening training), as injuries would negatively impact job satisfaction.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
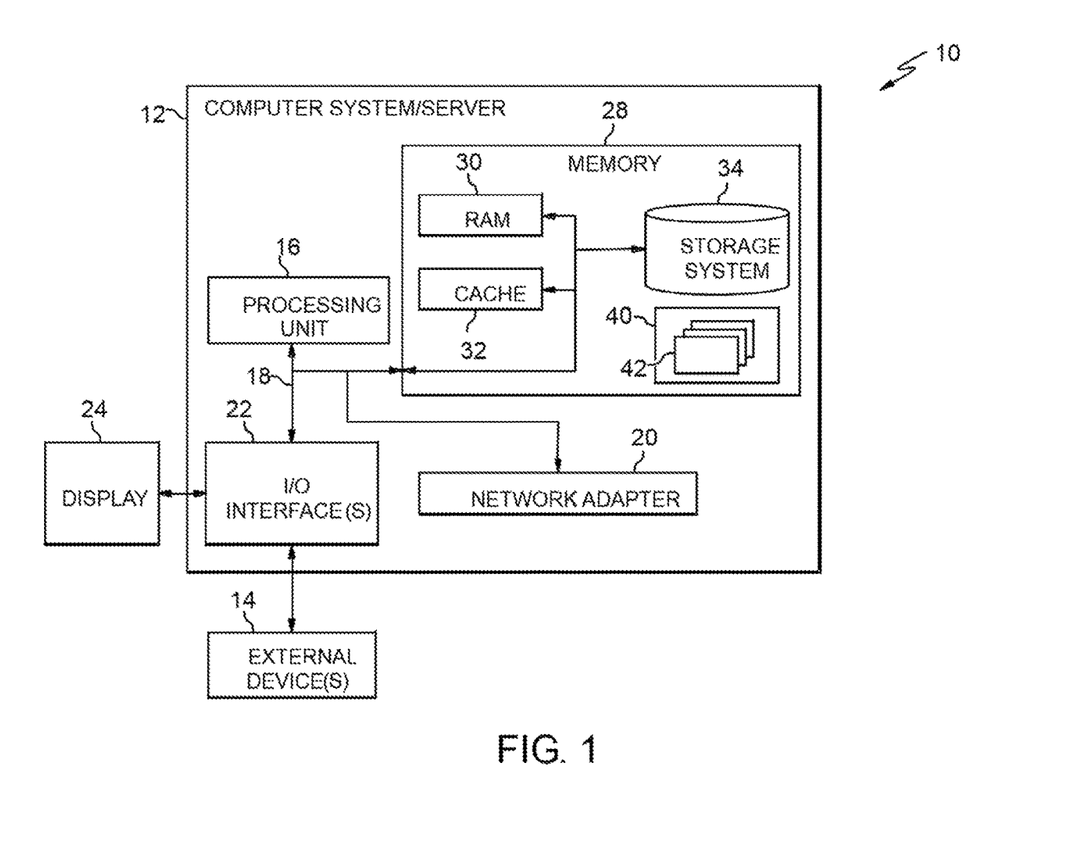
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
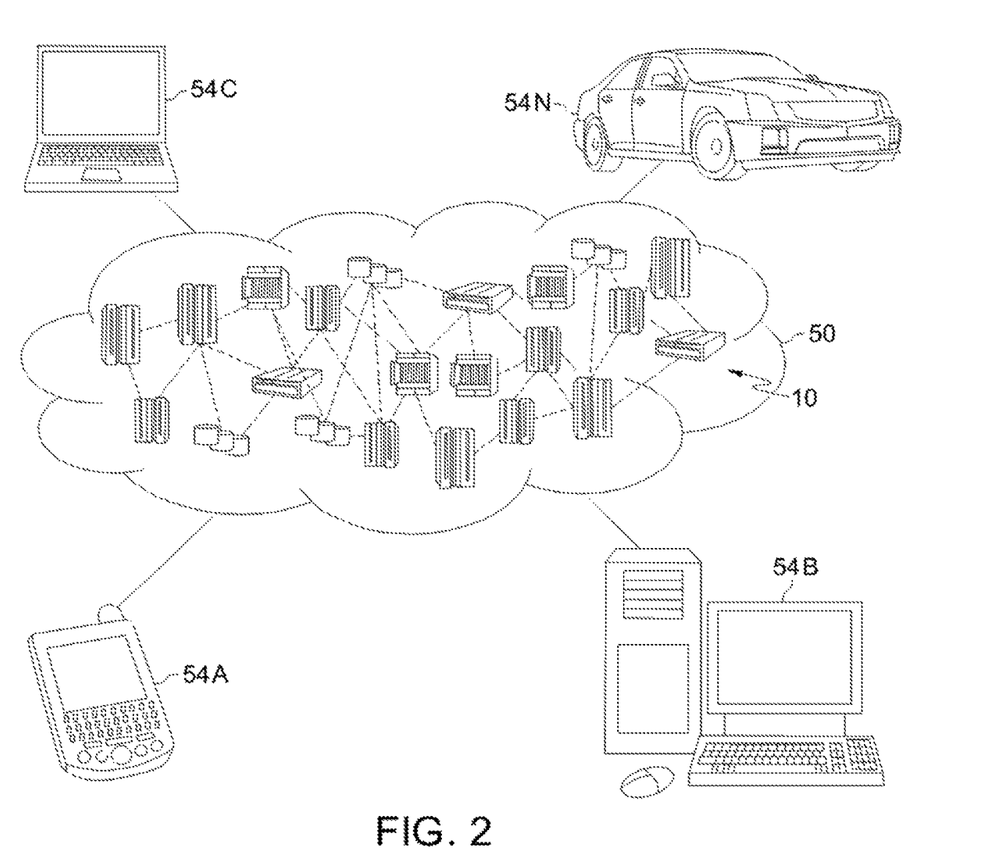
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
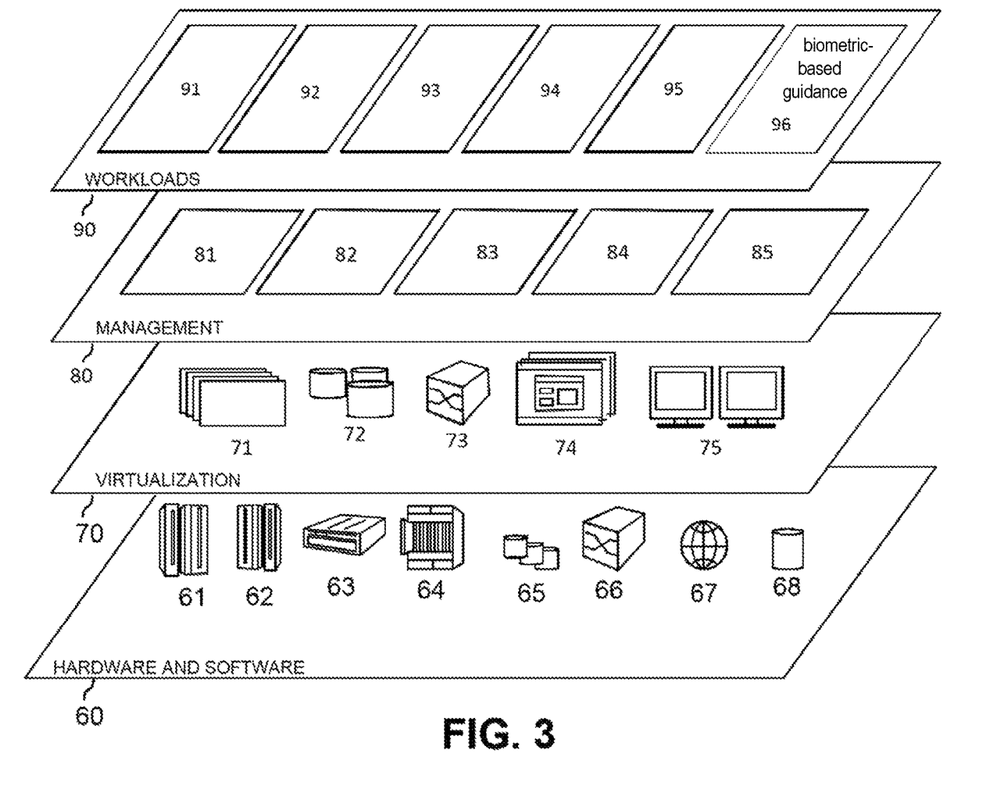
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and biometric-based guidance 96.

Implementations of the invention may include a computer system/server 12 of FIG. 1 in which one or more of the program modules 42 are configured to perform (or cause the computer system/server 12 to perform) one of more functions of the biometric-based guidance 96 of FIG. 3. For example, the one or more of the program modules 42 may be configured to: receive preference information from a plurality of people, the preference information including an individual level of preference for various activities for each of the people; receive biometric data of the people, the biometric data relating to the various activities; build a corpus of relationships between the preference information and the biometric data; receive biometric data of a user; and predict a user level of preference for a particular activity of the various activities, the predicting being based on a comparison of the biometric data of the user and the biometric data of the people who participated in the particular activity.

Figure 4:
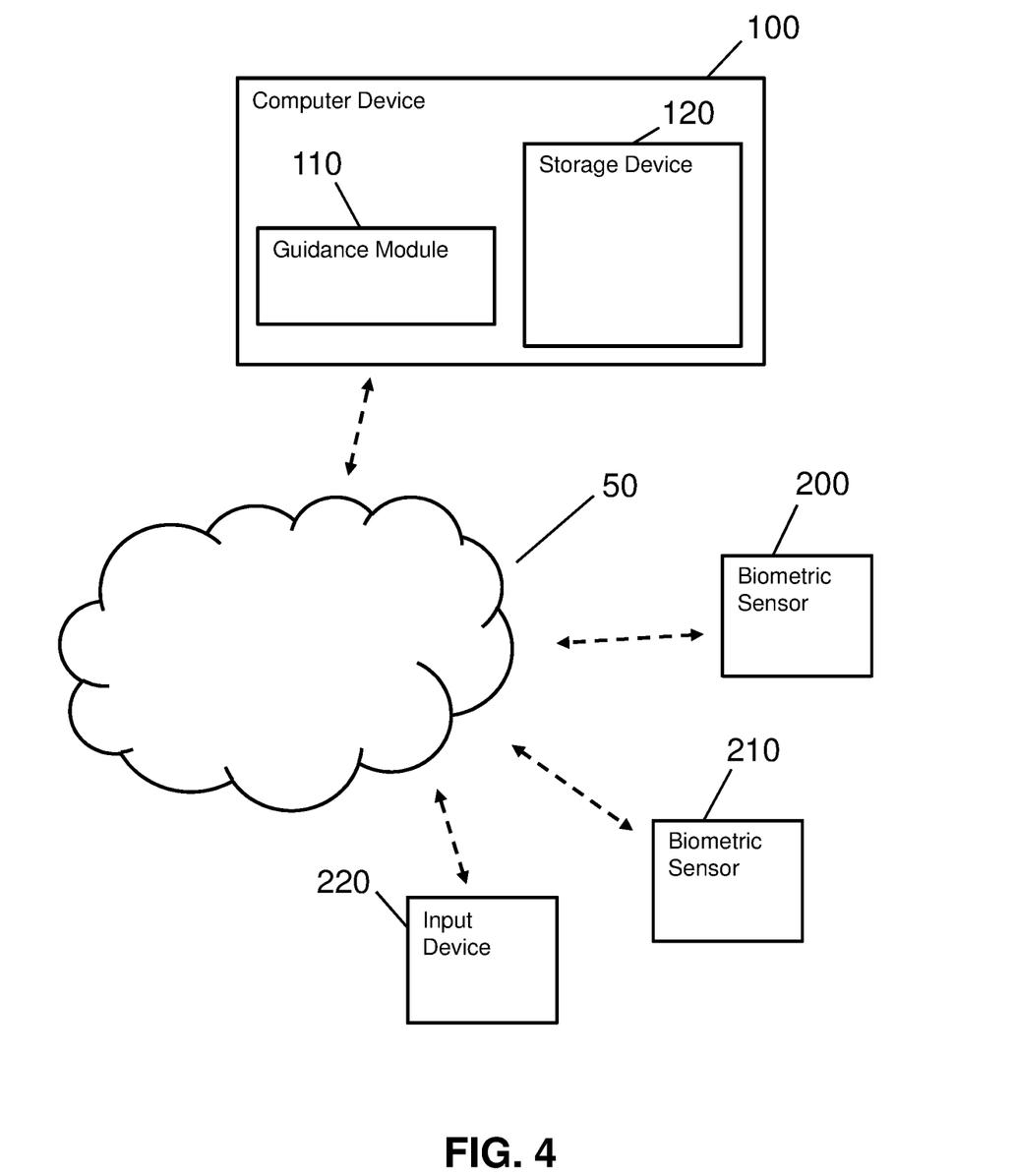
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 (such as, for example, computer system/server 12 of FIG. 1) that includes a guidance module 110 (such as, for example, one of program modules 42 of FIG. 1) and a storage device 120 (such as, for example, storage system 34 of FIG. 1). Computer device 100 communicates to various devices through cloud computing environment 50. In embodiments, computer device 100 communicates with various devices through a communication system other than the Internet. In this example, biometric sensor 200 is an IoT device that senses a biometric of a user such as, for example, heart rate. In this example, biometric sensor 210 is a non-IoT device that senses a biometric of a user such as, for example, knee angle. In embodiments, devices 200, 210 are sensors such as, for example, a heart rate sensor, a blood pressure sensor, a joint angle sensor, a respiratory rate sensor, a blink sensor, an eye position sensor, a skin temperature sensor, a body temperature sensor, and any other sensor that senses a biometric and provides biometric data. In this example, input device 220 is an IoT device that allows a user to input data into computer device 100. Non-exclusive examples of input device 220 include a microphone, a video camera, a still camera, a keyboard, a touch screen, an eye motion sensor, sensors and devices for users that are in some way physically or otherwise challenged, and other input devices.

Figure 5:
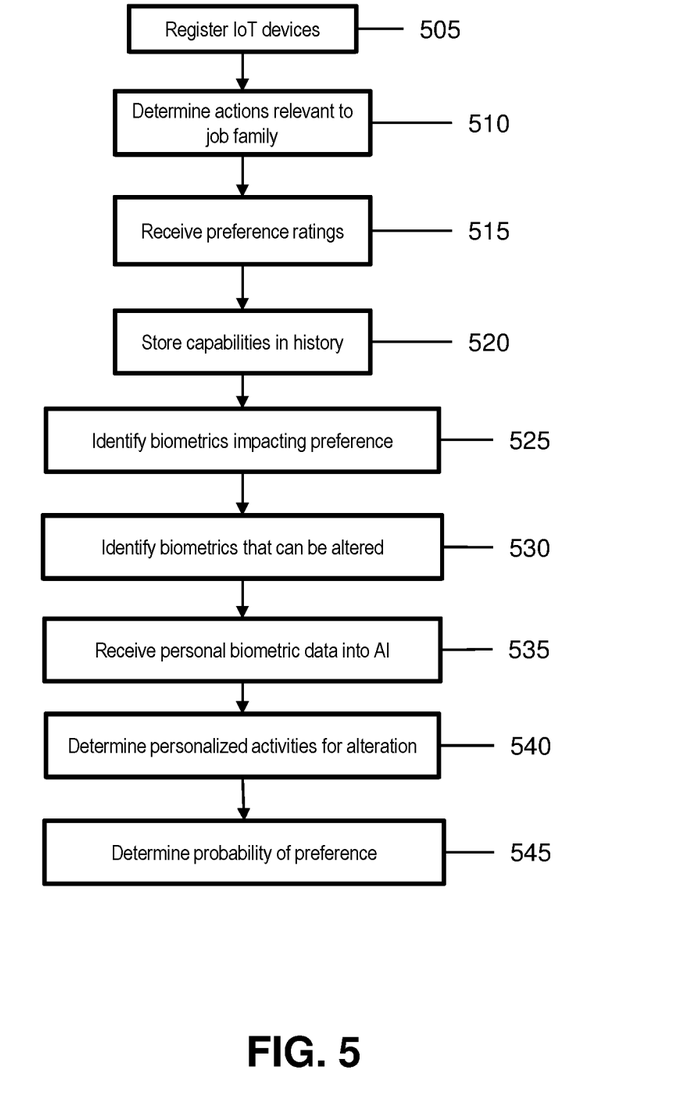
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system registers IoT devices (and other devices) that are used to determine the user's capabilities. In this disclosure, when the term IoT devices is used, it is understood that in some embodiments other devices, such as non IoT devices, are also used. In embodiments, and as described with respect to FIG. 4, the registered devices are biometric sensors 200, 210. Communication from the IoT devices to guidance module 110 is provided by cloud computing environment 50.

At step 510, the system determines actions that are relevant to a particular job family. In embodiments, and as described with respect to FIG. 4, input device 220 is used by the user to input to guidance module 110 the job family the user is considering. Guidance module 110 searches storage device 120 and/or sources outside of computer device 100 for historical data regarding users working in the same job family that have had positive experiences in the jobs in that job family.

At step 515, the system receives satisfaction ratings of the user. In embodiments, and as described with respect to FIG. 4, biometric sensors 200, 210 capture biometrics of the user during the user's performance of actions that are relevant to the job family (e.g., determined at step 510) that the user is considering. The user inputs satisfaction ratings and/or success/failure ratings with the actions to guidance module 110 through input device 220.

At step 520, the system stores the capabilities of the user, as determined by the satisfaction ratings and/or success/failure ratings captured in step 515, with crowd sourced data in a historical corpus residing on storage device 120. For example, guidance module 110 examines the satisfaction ratings and/or success/failure ratings to determine the capabilities of the user. In embodiments, guidance module 110 determines that a particular action is a capability of the user based on the user indicating satisfaction and/or success in performing the action. In embodiments, the historical corpus is used as a source of the historical data searched in step 510. In embodiments, any unique identifiers obtained during registration of the user, or any other unique identifiers, are removed from the user's data when doing crowd comparisons.

At step 525, the system identifies one or more biometrics that impact satisfaction of the user. In embodiments, guidance module 110 identifies biometric readings of the user that are outliers when compared to job family and average satisfaction ratings of the average employee in the job family. In embodiments, the guidance module identifies any biometrics of the user that are below average for the job or job family.

At step 530, the system identifies biometrics of the user that can be altered. In embodiments, guidance module 110 compares any below average biometrics identified in step 525 to an alteration corpus portion of the historical corpus to identify capabilities that can be altered.

At step 535, the system receives personal biometric data of the user to generate specific biometric alteration options. In embodiments, an artificial intelligence (AI) section of guidance module 110 receives the personal biometric data of the user for use in step 540. In embodiments, when additional biometric data is needed from the user above what is already available, the system prompts the user for the additional biometric data. For example, the system may prompt the user to change a setting on a device of theirs (for example, smart phone) to "opt-in" or to obtain one or more devices/sensors.

At step 540, the system determines personal activities for the user to alter. In embodiments, guidance module 110 compares the biometrics identified in step 530 as being capable of alteration to a list of items (such as training) that can be used to alter biometrics. The guidance module presents the results of the comparison to the user to recommend, for example, training that will alter the biometrics that can benefit from alteration. In embodiments, the user selects (through input device 220) some or none of the recommendations.

At step 545, the system determines a probability of satisfaction of the user based on the recommendations selected by the user in step 540. In embodiments, guidance module 110 compares satisfaction ratings of the crowd source data with the biometrics of the user to develop a time line for expected alteration based on a change in probability for the alteration activities (recommendations) selected.

The example shown in FIG. 5 is just one example of embodiments of the invention that compare current biometric data of a user to a historical corpus of data from people that have performed an activity (such as a job) that the user is considering in order to present to the user ways to improve the likelihood of the user preferring that activity. Other embodiments include less than all of the steps shown in FIG. 5.

Figure 6:
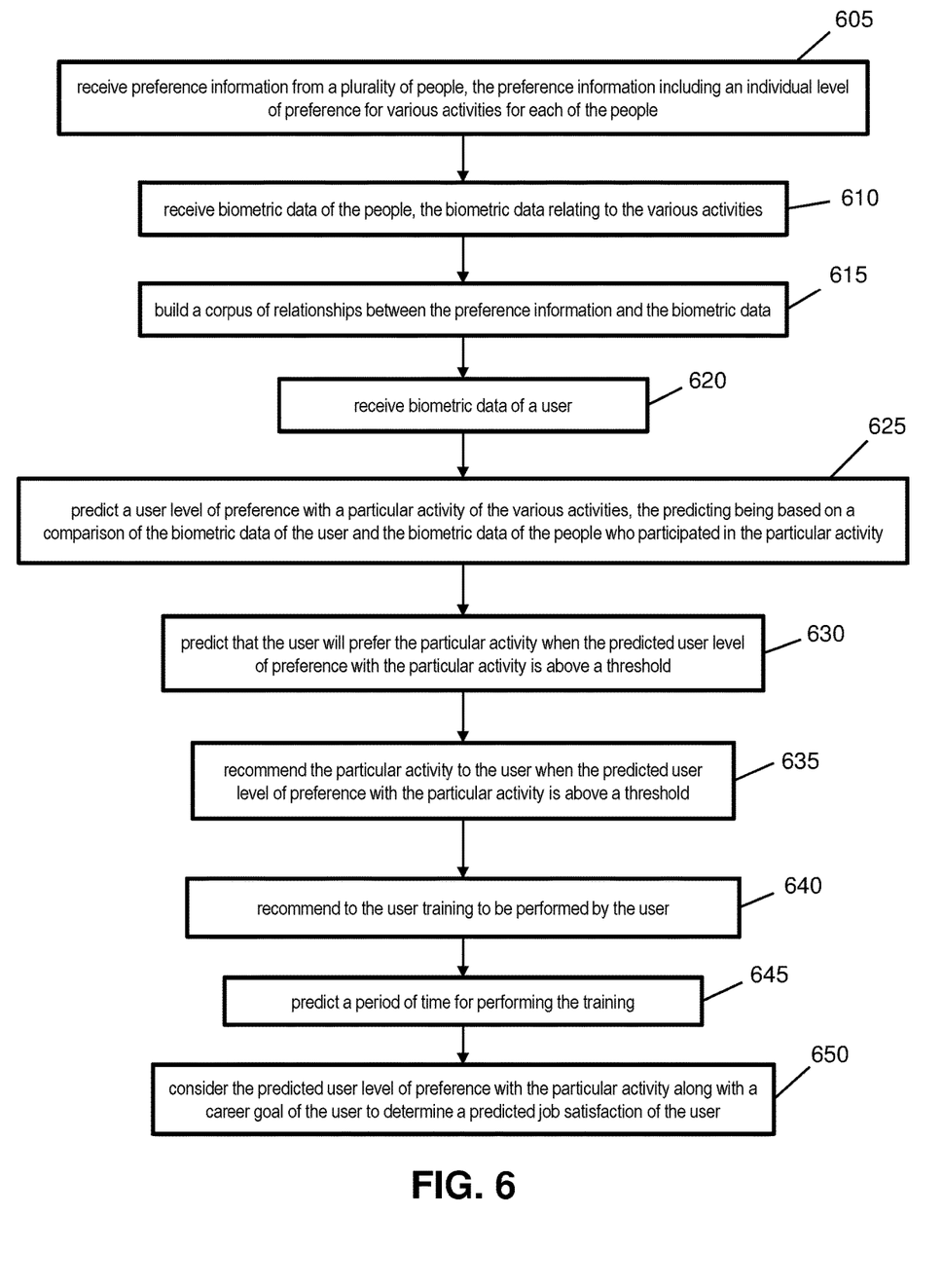
FIG. 6 shows a flowchart of an exemplary method in accordance with aspects of the invention.

FIG. 6 shows a flowchart of an exemplary method in accordance with aspects of the present invention. Steps of the method may be carried out in the environment of FIG. 4 and are described with reference to elements depicted in FIG. 4. In this embodiment, job satisfaction of the user is predicted for a particular job.

At step 605, guidance module 110 receives preference information from a plurality of people, the preference information including an individual level of preference for various activities for each of the people. For example, the preference information includes a level of job preference experienced by plumbers. In embodiments, preference information comprises feedback obtained from the plurality of people, wherein the feedback quantifies a person's level of satisfaction with the activity. The feedback may be obtained, for example, via electronic surveys and other methods.

At step 610, guidance module 110 receives biometric data of the people from whom preference information was received in step 605. The biometric data relates to the various activities performed by the people. For example, the biometric data includes biometrics such as heart rate, knee bend angle, blood pressure, flexibility, arm strength, and other attributes that are determined as being relevant to the job (e.g., a plumber in this example).

At step 615, guidance module 110 builds a corpus of relationships between the preference information from step 605 and the biometric data from step 610. In embodiments, the corpus is stored in storage device 120. For example, the flexibility data of plumbers (received in step 610) is related to the preference information of plumbers (received in step 605) as an indication of whether flexibility is important to the preference with being a plumber. In embodiments, the building the corpus of relationships between the preference information and the biometric data comprises determining correlations between the preference information and the biometric data. In embodiments, the system uses the correlations to build a model that defines a relationship between biometric data and preference level of an activity. In embodiments, the system uses the model to predict a preference level of an activity based on receiving an input of biometric data (e.g., at step 625 described herein).

At step 620, guidance module 110 receives biometric data of a user from biometric sensor 200. For example, the flexibility of the user is sensed by biometric sensor 200 in the form of a knee angle sensor.

At step 625, guidance module 110 predicts a predicted user level of preference of a particular activity of the various activities, the predicting being based on a comparison of the biometric data of the user and the biometric data of the people who participated in the particular activity (the corpus stored in storage device 120). For example, guidance module 110 compares the flexibility of plumbers who prefer their job with the flexibility of the user to predict whether the user would prefer being a plumber. In embodiments, guidance module 110 predicts a user level of preference of 90% (or some other percentage or rating) if the flexibility of the user compares favorably to the flexibility of plumbers who prefer their job. In embodiments, multiple biometrics (not just flexibility) are compared and considered by guidance module 110 to predict the preference level of the user with the activity (in this case, being a plumber).

At step 630, in embodiments, guidance module 110 predicts that the user will prefer the activity (being a plumber) when the predicted user level of preference made in step 625 is above a threshold. For example, guidance module 110 will predict that the user will prefer being a plumber when the predicted user level of preference from step 625 is above 85%.

At step 635, guidance module 110 recommends the particular activity to the user when the predicted user level of preference with the particular activity is above a threshold. For example, because the predicted user level of preference from step 625 is 90% and is, therefore, above the threshold of 85%, guidance module 110 recommends the particular activity (being a plumber) to the user. In a case where the predicted user level of preference is below the threshold (for example, 75%), guidance module 110 does not recommend the particular activity (being a plumber) to the user.

At step 640, guidance module 110 recommends to the user training to be performed by the user. In embodiments, guidance module 110 recommends training to the user when the user either: (1) desires to alter a biometric in order to increase the predicted user level of preference above the threshold; or (2) would benefit from altering a biometric to elevate the predicted user level of preference even further above the threshold. In embodiments, the physical actions are to change the biometrics of the user such that subsequent biometric data of the user more closely matches the biometric data of the people who participated in the particular activity and whose level of preference with the particular activity is above the threshold.

At step 645, guidance module 110 predicts a period of time for performing the training. In embodiments, guidance module 110 predicts a period of time for which the user will perform the training to alter one or more biometrics that will, in turn, increase the predicted user level of preference above the threshold, or even further above the threshold. In embodiments, guidance module 110 makes the prediction by comparing historical data regarding individuals with biometrics similar to the user and historical periods of time for altering the biometric in question to particular levels. For example, if historical data indicates that it normally takes four months of particular training to increase knee flexibility from 90 degrees to 110 degrees, and the user currently experiences a 90-degree flexibility, then the system predicts the period of time to be four months. In embodiments, guidance module 110 predicts a period of time for performing the training to result in future biometric data of the user equaling the biometric data of the people who participated in the particular activity and whose level of preference with the particular activity is above the threshold.

In step 650, guidance module 110 considers the predicted user level of preference with the particular activity along with a career goal of the user to determine a predicted job satisfaction of the user. For example, guidance module 110 predicts a high job satisfaction of the user being a plumber when the predicted user level of preference with being a plumber is above 90% and the user has stated that a career goal of the user is to work with his/her hands. Examples of other career goals are helping others, a particular salary level, working outside of an office, working remotely, and the availability of part time work in semi-retirement.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    receiving, by a computer device, preference information from a plurality of people working in a job, the preference information including an individual level of preference for various activities associated with the job for each of the people;
    receiving, by the computer device, sensor data from remote sensors of the plurality of people, the sensor data including biometric data of the plurality of people and relating to the various activities associated with the job;
    determining, by the computer device, correlations between the preference information from the plurality of people and the sensor data from the remote sensors of the plurality of people relating to the various activities associated with the job;
    building, by the computer device, a predictive model that defines relationships between the sensor data and preference levels for each of the various activities associated with the job based on the correlations between the preference information from the plurality of people and the sensor data of the plurality of people;
    receiving, by the computer device, a user selection of the job via a user interface;
    receiving, by the computer device, current sensor data from one or more remote Internet of Things (IOT) devices of the user via a network connection, wherein the current sensor data is generated during the user's performance of physical actions;
    inputting, by the computer device, the current sensor data into the predictive model, thereby generating a predicted user level of preference for a particular activity of the various activities associated with the job by comparing biometric data of the user from the current sensor data with biometric data of a set of the plurality of people who participated in the particular activity whose preference information indicates positive experiences in the job;
    based on the predicted user level of preference for the particular activity, identifying, by the computing device, a biometric of the biometric data of the user that impacts the user level of preference for the particular activity by identifying the biometric that is a statistical outlier when compared to a same biometric of the set of the plurality of people; and
    presenting, by the computing device, a recommended training to be performed by the user to change the biometric over a period of time to more closely match the same biometric of the set of the plurality of people.

2. The computer-implemented method of claim 1, further comprising:
    determining, by the computer device, that the predicted user level of preference for the particular activity is above a threshold; and
    predicting, by the computer device, that the user will prefer the particular activity in response to the determining that the predicted user level of preference for the particular activity is above the threshold.

3. The computer-implemented method of claim 1, further comprising:
    determining, by the computer device, that the predicted user level of preference for the particular activity is above a threshold; and
    recommending, by the computer device, the particular activity to the user in response to the determining that the predicted user level of preference for the particular activity is above the threshold.

4. The computer-implemented method of claim 1, wherein the particular activity is a profession.

5. The computer-implemented method of claim 1, further comprising:
    identifying, by the computer device, that the biometric of the biometric data of the user can be changed to increase the predicted user level of preference of the particular activity based on historic data of the plurality of people working in the job;

and
determining, by the computer device, the period of time to perform the recommended training to obtain altered biometric data of the user that increases the predicted user level of preference above a threshold value.

6. The computer-implemented method of claim 5, wherein the set of the plurality of people have a level of preference for the particular activity above a threshold.

7. The computer-implemented method of claim 6, wherein the recommended training comprises physical actions to change the biometric of the biometric data of the user such that subsequent sensor data of the user more closely matches the sensor data of the set of the plurality of people whose level of preference for the particular activity is above the threshold.

8. The computer-implemented method of claim 7, wherein altering the biometric data of the user that increases the predicted user level of preference above the threshold value comprises altering the biometric data based on predicted future sensor data of the user equaling the sensor data of the set of the plurality of people whose level of preference with the particular activity is above the threshold.

9. The computer-implemented method of claim 1, wherein the particular activity is a profession, the method further comprising determining, by the computer device, a predicted job satisfaction of the user based on the predicted user level of preference for the profession along with a career goal of the user.

10. The computer-implemented method of claim 1, wherein the particular activity includes a physical component that must be performed by the user.

11. The computer-implemented method of claim 1, wherein the computer device includes software provided as a service in a cloud computing environment.

12. The method of claim 1, wherein the receiving the current sensor data from the one or more remote Internet of Things (IOT) devices of the user comprises receiving the biometric data of the user at an artificial intelligence section of the computing device, and wherein the biometric data of the user is received from one or more remote sensors of the one or more remote Internet of Things (IOT) devices, wherein the one or more remote sensors are selected from the group consisting of: a heart rate sensor, a blood pressure sensor, a joint angle sensor, a respiratory rate sensor, a blink sensor, an eye position sensor, a skin temperature sensor, and a body temperature sensor.

13. A computer program product, the computer program product comprising a computer readable storage medium having program instructions embodied therewith, the program instructions executable to cause a virtual assistant computing device to:
receive preference information from a plurality of people working in the job, the preference information including an individual level of preference for various activities associated with the job for each of the plurality of people;
receive sensor data from remote sensors of the plurality of people, the sensor data including biometric data of the plurality of people and relating to the various activities associated with the job;
determine correlations between the preference information from the plurality of people and the sensor data from the remote sensors of the plurality of people related to the various activities associated with the job;
build a predictive model that defines relationships between the sensor data and preference levels for each of the various activities associated with the job based on the correlations between the preference information from the plurality of people and the sensor data of the plurality of people;
receive, via a user interface, a user input comprising a job of interest to the user;
receive current sensor data from one or more remote sensors of the user via a network connection, wherein the current sensor data is generated during the user's performance of physical actions and includes biometric readings of the user; and
input the current sensor data of the user into the predictive model, thereby generating a predicted user level of preference for a particular activity of the various activities associated with the job by comparing biometric data of the user from the current sensor data with biometric data of a set of the plurality of people who participated in the particular activity whose preference information indicates positive experiences in the job;
based on the predicted user level of preference for the particular activity, identify a biometric of the biometric data of the user that impacts the user level of preference for the particular activity by identifying the biometric that is a statistical outlier when compared to a same biometric of the set of the plurality of people; and
present a recommended training to be performed by the user to change the biometric over a period of time to more closely match the same biometric of the set of the plurality of people.

14. The computer program product of claim 13, further comprising program instructions executable by the computing device to cause the computing device to:
determine the predicted user level of preference for the particular activity is above a threshold; and
predict that the user will prefer the particular activity in response to the determining the predicted user level of preference for the particular activity is above the threshold.

15. The computer program product of claim 13, further comprising program instructions executable by the computing device to cause the computing device to:
determine the predicted user level of preference for the particular activity is above a threshold; and
recommend the particular activity to the user in response to the determining the predicted user level of preference for the particular activity is above the threshold.

16. The computer program product of claim 13, wherein the receiving the current sensor data from the one or more remote sensors of the user comprises receiving, at an artificial intelligence section of the computing device, the biometric data of the user from a remote sensor of the user;
and wherein the program instructions are further executable by the computing device to cause the computing device to:
determine physical actions to be performed by the user during the training to change the biometric of the biometric data of the user to meet a threshold amount established for the job; and
generate, by the artificial intelligence section of the computing device, biometric alteration options to recommend to the user in the recommended training based on the received biometric data of the user.

17. The computer program product of claim 16, further comprising program instructions executable by the computing device to cause the computing device to:

predict the period of time for performing the physical actions during the training that results in future biometric data of the user meeting the threshold amount established for the job.

18. A system comprising:

a processor, a computer readable memory, and a computer readable storage medium;

program instructions to receive preference information from a plurality of people working in a job, the preference information including an individual level of preference for various activities associated with the job for each of the plurality of people;

program instructions to receive sensor data from remote sensors of the plurality of people, the sensor data including biometric data of the plurality of people and relating to the various activities associated with the job;

program instructions to determine correlations between the preference information from the plurality of people and the sensor data from the remote sensors of the plurality of people relating to the various activities associated with the job;

program instructions to build a predictive model that defines relationships between the sensor data and preference levels for each of the various activities associated with the job based on the correlations between the preference information from the plurality of people and the sensor data of the plurality of people;

program instructions to receive a user selection of the job via a user interface;

program instructions to receive current sensor data from one or more remote wearable Internet of Things (IOT) devices of the user via a network connection, wherein the current sensor data is generated during the user's performance of physical actions; and program instructions to input the current sensor data of the user into the predictive model, thereby generating a predicted user level of preference for a particular activity of the various activities associated with the job by comparing biometric data of the user from the current sensor data with biometric data of a set of the plurality of people who participated in the particular activity whose preference information indicates positive experiences in the job;

program instructions to identify, based on the predicted user level of preference for the particular activity, a biometric of the biometric data of the user that impacts the user level of preference for the particular activity by identifying the biometric that is a statistical outlier when compared to a same biometric of the set of the plurality of people; and program instructions to present a recommended training to be performed by the user to change the biometric over a period of time to more closely match the same biometric of the set of the plurality of people, wherein the program instructions are stored on the computer readable storage medium for execution by the processor via the computer readable memory.

19. The system of claim 18, wherein the biometric data is received from one or more sensors selected from the group consisting of: a heart rate sensor, a blood pressure sensor, a joint angle sensor, a respiratory rate sensor, a blink sensor, an eye position sensor, a skin temperature sensor, and a body temperature sensor.

20. The system of claim 19, further comprising:

program instructions to determine and recommend physical actions to be performed by the user to change the biometric of the biometric data of the user to meet a threshold amount established for the job; and program instructions to predict the period of time for performing at least one of the physical actions during the training that results in future biometric data of the user meeting the threshold amount established for the job.

\* \* \* \* \*